United States Patent [19]

Musha et al.

[11] 4,059,511

[45] Nov. 22, 1977

[54] METHOD FOR CLARIFYING WASTE WATER CONTAINING FINELY DIVIDED OILY MATERIALS

[75] Inventors: Morito Musha, Seto; Tomizo Sawa, Nagoya; Osami Kato, Kasugai, all of Japan

[73] Assignee: Mitsubishi Rayon Co., Ltd., Tokyo, Japan

[21] Appl. No.: 700,075

[22] Filed: June 28, 1976

[51] Int. Cl.$^2$ .............................................. B01D 17/02
[52] U.S. Cl. .................................... 210/23 R; 210/41; 210/DIG. 5
[58] Field of Search ................ 210/DIG. 5, DIG. 26, 210/23 R, 40, 41, 43, 83

[56] References Cited

U.S. PATENT DOCUMENTS

| 3,352,778 | 11/1967 | Brink, Jr. et al. | 210/23 R |
| 3,797,666 | 3/1974 | Nakanishi et al. | 210/23 R |
| 3,960,719 | 6/1976 | Bresson | 210/23 R |

FOREIGN PATENT DOCUMENTS

| 47-38506 | 11/1969 | Japan | 210/DIG. 5 |
| 6,510,271 | 2/1967 | Netherlands | 210/23 R |

Primary Examiner—Wilbur L. Bascomb, Jr.
Assistant Examiner—Benoit Castel
Attorney, Agent, or Firm—Oblon, Fisher, Spivak, McClelland & Maier

[57] ABSTRACT

Waste water containing finely divided oily materials and solid materials suspended therein can be clarified by (1) forwarding the waste water successively through a plurality of fibrous strata which are arranged along a path of the waste water and each of said strata is composed of a mass of hydrophilic organic polymer fibers compressed in such a manner that the closer the location of a fibrous stratum is to the supply source of the waste water, the greater the gaps on the average are formed between the fibers in the stratum, while allowing the particles of the finely divided oily materials to coarsen and to catch and collect finely divided solid materials into the coarsened particles; (2) after passing through each of the fibrous strata, introducing the waste water into a space in which the coarsened particles are allowed to float and form a separate layer of the oily materials containing the solid materials on the upper surface of the waste water in the space; (3) discharging the oily materials containing the solid materials from each of the separate layers; and (4) delivering the clarified water.

5 Claims, 1 Drawing Figure

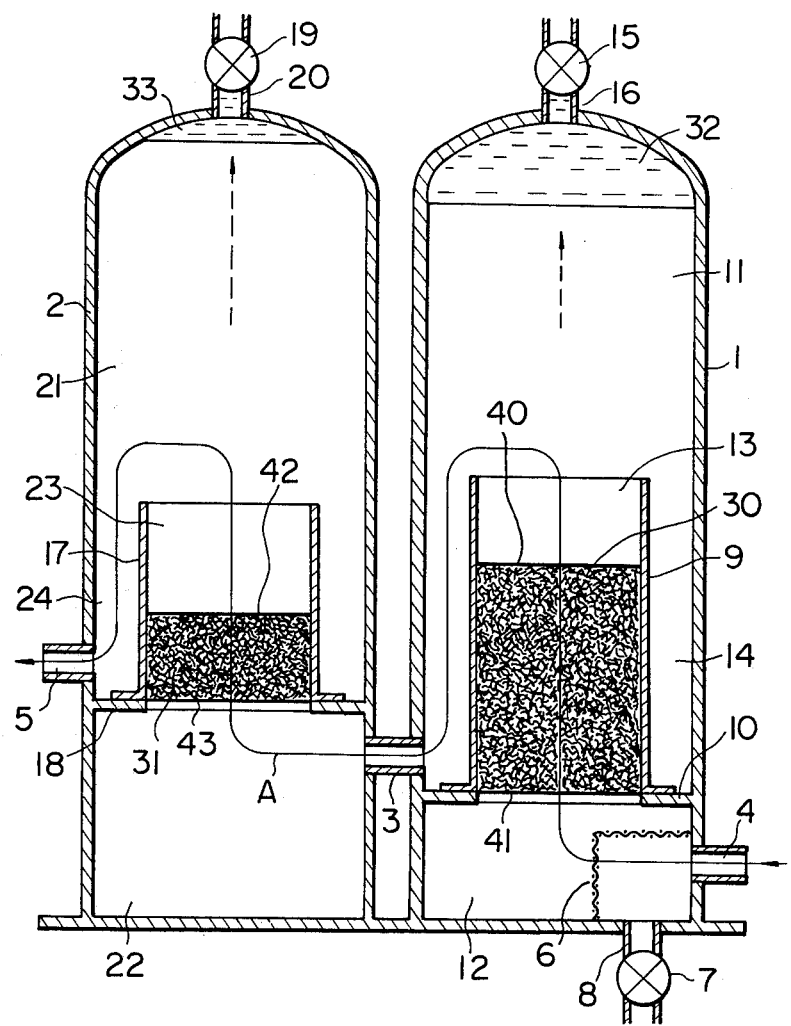

METHOD FOR CLARIFYING WASTE WATER CONTAINING FINELY DIVIDED OILY MATERIALS

The present invention relates to a method for clarifying waste water containing finely divided oily materials and solid materials.

In conventional methods for removing the oily materials from waste water by coarsening and floating the particles of the finely divided oily materials upward onto the upper surface of the waste water, it is known to utilize fibrous materials to form a fibrous stratum for coarsening the particles of the finely divided oily materials. In the conventional methods, hydrophobic fibers are employed for the above-mentioned purpose. However, when the oily materials in the waste water come into contact with the hydrophobic fibers, the oily material is absorbed by the hydrophobic fibers and many films of the oily materials are formed across the hydrophobic fibers. The formation of the films of the oily materials causes the pressure drop between the inlet face and the outlet face of the fibrous stratum to increase to such an extent that the clarifying operation of the waste water cannot be continued for a long period of time. The formation of the films consisting of the oily materials also results in redividing the coarsened particles of the oily materials, that is, so-called atomizing phenomenon. The film formation also results in formation of large size of water blisters which are enveloped in the films and have a specific gravity very close to that of the waste water and, therefore, difficult to float upward.

In order to eliminate the above-described disadvantages of the hydrophobic fiber stratum, it was attempted to utilize hydrophilic fibers to form the stratum for coarsening the particles of the finely divided oily materials. This attempt was disclosed, for example, in Japanese Patent Application Publication Nos. 16863/1969 and 36869/1974. In the former publication, the stratum for coarsening the particles of the finely divided oily materials is composed of a layer of compressed absorbent cotton located close to the supply source of the waste water and a layer of hydrophilic vegetable fibers located far from the supply source, which layers are incorporated to form one body. In the latter publication, hydrophilic fibers consisting of glass, metal or blast furnace slag are located in the fibrous stratum in such a manner that the further the location of the fiber from the supply source of waste water, the larger the diameter of the fiber. However, in the fibrous stratum of the Japanese Patent Application Publication No. 16863/1969, the gaps between the fibers in the stratum are closed and obstructed by solid materials found in the waste water within a relatively short time during the clarifying operation. Further, in the method of the Japanese Patent Application Publication No. 36869/1974, the hydrophilic property of the fibers are reduced and, then the hydrophobic property of the fiber is enhanced within a relatively short time during the clarifying operation. That is, the hydrophilic fibers are converted into hydrophobic fibers, the latter form of fibers exhibiting the same disadvantages as those found in the conventional hydrophobic fibers.

The object of the present invention is to provide a method for clarifying waste water containing finely divided oily materials and solid materials by using a plurality of fibrous strata for coarsening the particles of the finely divided oily materials, which strata do not absorb the oily materials.

Another object of the present invention is to provide a method for clarifying waste water containing finely divided oily materials and solid materials by using a plurality of fibrous strata for coarsening the particles of the finely divided oily materials without closing and obstructing; the gaps between the fibers in the strata with the solid materials.

Still another object of the present invention is to provide a method for clarifying waste water containing finely divided oily materials and solid materials, which method can be continuously carried out over a long period of time.

The above objects can be accomplished by the method of the present invention for clarifying waste water containing finely divided oily materials and solid materials suspended therein, which comprises:

forwarding waste water containing finely divided oily materials and solid materials through a plurality of fibrous strata arranged along a path of said waste water and each of said strata composed of a mass of hydrophilic organic polymer fibers, said fiber mass being compressed in such a manner that the closer the location of the fibrous stratum is to the supply source of said waste water, the greater are the gaps on the average formed between the fibers in the stratum, while allowing the particles of said finely divided oily materials to coarsen and to catch and collect the finely divided solid materials into said coarsened particles;

after passing through each of said fibrous strata, introducing said waste water into a space in which said coarsened particles of said oily materials are allowed to float and form a separate layer on the upper surface of said waste water in said space;

discharging said oily materials together with said solid materials from each of said separate layers, and;

delivering said remaining water in a clarified state after separation from said oily materials and said solid materials.

According to the method of the present invention, the fibrous strata for coarsening the particles of the finely divided oily material do not adsorb the oily materials, because the strata are composed of the hydrophilic fibers.

Accordingly, even when the method of the present invention is continuously carried out over a long period of time, the pressure drop of the waste water generated when the waste water passes through each fibrous stratum, is small. Further, the method of the present invention has a great advantage in that the finely divided solid materials can be collected by the coarsened particles of the oily materials without using a filter, because a plurality of strata is arranged along the path of the waste water in such a manner that the closer the location of the stratum is, the greater are the gaps on the average between the fibers in the stratum.

In the method of the present invention, the particles of the finely divided oily materials are prevented from rapidly passing through the fibrous strata by the oil-excluding property of the hydrophilic fibers. The particles of the oily materials thus intercepted have many opportunities for contacting and incorporating with each other to form a larger size of particles before completely passing through the strata. This phenomenon is referred to as "coarsening of particles".

Further, it is important to note that the coarsened particles of the oily materials tend to occupy a surface area as small as possible due to the surface tension of the oily materials. Accordingly, the coarsened particles can pass through the gaps between the fibers in the strata without closing and obstructing the gaps. Therefore, the pressure drop does not increase or increases very slightly even after a large amount of waste water has passed through the strata. Further, there is neither an atomizing phenomenon nor a formation of water particles enveloped in the films of the oily materials due to the method of the present invention. The coarsened particles of the oily material can rapidly float up onto the upper surface of the waste water and form a separate layer of the oily materials thereon. After the waste water has passed through the fibrous stratum located closest to the supply source of the waste water, portions of the particles of finely divided oily materials which have not been coarsened are still suspended in the waste water. The waste water is sent to a next fibrous stratum in which the fibers are located so as to form gaps therebetween smaller than those in the preceding stratum.

In the next fibrous stratum, all or a portion of the particles of the finely divided oily materials can be coarsened and separated from the waste water by the same operation as in the preceding stratum without increasing or with very slightly increasing the pressure drop.

The waste water containing the oily materials further contains the finely divided solid materials most of which consist of soft solid substances. If a filter is used for removing the solid materials, the openings in the filter are closed and obstructed by the soft solid materials. This results in a great increase in the pressure drop between the inlet face and the outlet face of the filter.

In the method of the present invention, firstly, the waste water passes through a fibrous stratum located closest to the supply source of the waste water. In this closest fibrous stratum, the fibers are arranged with gaps, each of a relatively large size, formed therebetween. Accordingly, the particles of finely divided solid materials can pass through the gaps between the fibers in the closest stratum. However, while passing through the gaps, a portion of the particles of the finely divided solid materials is caught by the coarsened particles of the oily materials and collected thereinto. The particles of the finely divided oily materials are coarsened and floated up together with the caught particles of solid materials. Another portion of the particles of the solid materials which have not been collected in the closest stratum is sent to the next stratum together with the waste water. In the next stratum, the same procedures for collecting the particles of the finely divided solid materials as in the closest stratum are carried out. Therefore, according to the method of the present invention, the finely divided solid materials can be completely eliminated without closing and obstructing the gaps between the fibers in the strata and, therefore, without a great increase in the pressure drop.

The hydrophilic fibers usable in the method of the present invention refer to fibers which can be readily wetted with water and can not be wetted with oily materials. That is, even when immersed in a mixture of water and oily materials, agitated and, then, kept without agitation for a certain period of time, most of the surface of the hydrophilic fiber is not wetted with the oily materials. The hydrophilic fibers usable for the method of the present invention may be selected from cotton, ramie, flax, hemp, jute, viscose rayon and hydrophilic synthetic fibers. The hydrophilic synthetic fibers may be hot water-soluble polyvinyl alcohol fibers produced by heat-treating cold water-soluble polyvinyl alcohol fibers at a temperature of 190° to 240° C, or may consist of a synthetic polymer having 0.2 meq/g or more of a free acid radical, for example; carboxylic, phosphoric or sulfonic acid radical, or its dissociative salt radical.

However, glass fibers, metal fibers and blast furnace slag fibers and other inorganic fibers do not belong to the hydrophilic fibers usable for the method of the present invention.

The hydrophilic synthetic fiber consisting of the polymer having the free acid radical or its salt radical may be a hydrophilic acrylic polymer fiber which is produced by reacting hydroxylamine with acrylonitrile polymer or coopolymer in the form of fiber to intermolecularly link the polymer or copolymer, and, then, hydrolyzing a portion of nitrile radicals in the polymer or copolymer with an alkali, for examle, sodium or potassium hydroxide, to convert the nitrile radicals to carboxylic acid radicals or its alkali salt radicals.

The acrylic copolymer to be converted to the hydrophilic acrylic copolymer fibers usable for the present invention, preferably produced by copolymerizing at least 85% by weight of acrylonitrile with the balance of one or more copolymerizable monomers. The copolymerizable monomer may be selected from vinyl acetate, methyl acrylate, acrylic amide, sodium methallyl-sulfonate and potassium vinylbenzene sulfonate.

The hydrophilic synthetic polymer or copolymer fibers mentioned above are most preferable for the method of the present invention because said fibers have a high resistance to putrefaction, a high stability in the dimensions and form of said fibers, a high durability, and a high hydrophilic property. Also, said fibers can be easily produced in a desired denier thereof. Especially, the above-mentioned hydrophilic acrylonitrile polymer or copolymer fibers having a degree of swelling in water of 15 to 70% are most suitable as fibers for use in the method of the present invention. The degree of swelling in water is determined in accordance with the following equation:

$$\text{Degree in percent of swelling} = (X_2 - X_1)/X_1 \times 100$$

wherein $X_1$ is a weight of the fibers which have been absolutely dried and $X_2$ is a weight of the fibers which have been immersed in water at a temperature of 20° C for 2 hours and afterwards subjected to centrifugal water-separation at a rotation speed of 2400 r.p.m. for 10 minutes. The hydrophilic fibers may be or may not be crimped.

The hydrophilic fibers also may be used in the form of a mass of loose fibers, knitted fabric, woven fabric, non-woven fabric, for example, needle-punched non-woven fabric, spun yarn, or a bundle of fiber yarns or laminated fiber yarns.

Generally, the pressure drop of the waste water generated between the inlet face and the outlet face of the fibrous stratum, depends on the width, length and number of the gaps formed between the fibers in the stratum. The clarifying effect of the stratum also depends on the width, length and number of the gaps formed between the fibers in the stratum. The width, length and number of the gaps defined on the denier of the hydrophilic fibers, and density and thickness of the stratum.

In order to continue the clarifying operation of the present invention over a long period of time, it is preferable to have a major portion of the finely divided oily materials and the minor portion of the finely divided solid materials be separated from the waste water by one or more fibrous strata located in a relatively upstream part of the path of the waste water and to have relatively great gaps formed between the fibers without closing and obstructing said gaps and greatly increasing the pressure drop; and the remaining oily materials and solid materials are completely separated from the waste water by one or more fibrous strata located downstream the above-mentioned upstream stratum or strata, and having relatively small gaps located between the fibers. In this case, it is preferable that at least one said upstream stratum is composed of the aforementioned hydrophilic fibers having a denier of 10 to 300 and distributed so as to form gaps of 40 to 180 microns, on the average, between them, and has a density of 0.1 to 0.45 g/cm$^3$, a thickness of 3 to 100 cm and a water permeability of 5 cm/sec or less under a pressure of 40 cm aqua. In the case where the above-specified upstream stratum is composed of spun yarns consisting of the hydrophilic fibers, it is preferable that the spun yarns have a metric yarn number count of 3 to 150.

In the aforementioned downstream stratum, it is preferable that said stratum is composed of the aforementioned hydrophilic fibers having a denier of 1 to 100 and distributed with gaps therebetween of 15 to 100 microns, and has a density of 0.05 to 0.45 g/cm$^3$, a thickness of 3 to 100 cm and a water premeability of 3 cm/sec or less under pressure of 40 cm aqua. In connection with the above-specified upstream stratum and downstream stratum, another stratum or strata having greater gaps between the fibers than those in the above-specified upstream stratum may be located upstream the above-specified upstream stratum. In addition, still another stratum or strata having smaller gaps between the fibers than those in the above-specified downstream stratum, may be located downstream the above-specified downstream stratum.

However, it is essential to note in the method of the present invention that the farther the location of a stratum is from the supply source of the waste water, the smaller the gaps, on the average, are formed between the fibers in the stratum. That is, in other words, the gaps in a stratum are not larger, on the average, than those in another stratum located upstream the stratum.

Also, in order to continuously effect the method of the present invention over a long period of time, it is important that the pressure drop generated between the inlet face of the stratum located closest to the waste water supply source and the outlet face of another stratum located furthermost from the waste water supply source be as low as possible as long as the clarifying effect of the strata is satisfactorily high. Generally, it is preferable that the pressure drop be 1.5 kg/cm$^2$ or lower.

Further, it is important that the thickness of the strata does not decrease during the clarifying operation period, because a reduction in the thickness of the strata results in increasing the pressure drop. Accordingly, it is preferable that the strata have substantially no change in dimensions thereof under a pressure of 1 kg/cm$^2$ or less.

Further, in order to adjust the gaps between the fibers in the fibrous strata, it is preferable that the following condition exists whereby the farther the location of a stratum from the waste water supply source, the smaller the denier of the fibers in the stratum and/or the greater the density of the stratum.

The features and advantages of the method of the present invention will be illustrated in detail by the following description with reference to the accompanying drawing which is an explanatory cross section of an embodiment of an apparatus for carrying out the method of the present invention.

Referring to the drawing, the clarifying apparatus is provided with two clarifying outer columns, that is, a first outer column 1 and a second outer column 2, connected to each other through a connection pipe 3. The first outer column 1 is connected to a supply source (not shown) of waste water through a supply pipe 4, and the second outer column 2 is connected to a receiver (not shown) of the clarified water through a delivery pipe 5.

The first outer column 1 is provided with a strainer 6 for removing sludge from the waste water located close to the supply pipe 4, a valve 7 for discharging the sludge, connected to the strainer 6 through a pipe 8, a first vertical inner column 9 located within the first outer column 1 and supported on a partition plate 10 by which the inside space of the first outer column 1 is divided into two parts, that is, an upper space 11 and a lower space 12. The upper space 11 is connected to the lower space 12 through the inside space 13 of the first inner column 9. An annular space 14 is formed between the outside surface of the first inner column 9 and the inside surface of the first outer column 1, and connected to the connecting pipe 3. The first outer column 1 is provided with a discharge valve 15 for discharging oily waste materials and connected to the top of the first outer column 1 through a pipe 16.

The second outer column 2 is provided with a second inner column 17 located within the second outer column 2 and supported by a partition plate 18 and a valve 19 for discharging oily waste materials, said valve 19 is connected to the top of the second outer column 2 through a pipe 20. The partition plate 18 divides the inside space of the second outer column 2 into an outer space 21 and a lower space 22 which are connected to each other through an inside space 23 of the second inner column 17. An annular space 24 is formed between the inside surface of the second outer column 2 and the outside surface of the second inner column 17, and connected to the delivery pipe 5.

A hydrophilic fiber mass is stuffed into the inside space 13 of the first inner column 9 to form a first fibrous stratum 30. The first fibrous stratum 30 is interposed between an upper net 40 and a lower net 41. Another hydrophilic fiber mass is stuffed into the inside space 23 in the second inner column 17 to form a second fibrous stratum 31 which is interposed between an upper net 42 and a lower net 43. All or some of the upper and lower nets 40 to 43 may be replaced by grid or grids or perforated plate or plates. It is preferable that the above-mentioned net, grid or perforated plate has an opening area as large as possible so far as the net, grid or perforated plate can hold the fibrous stratum without separating the fibers from the stratum.

The inner columns and nets, grids or perforated plates may be made of a metal, for example, stainless steel, aluminum and copper, or a synthetic polymer, for example, polyesters, polyamides, polypropylene and polyvinyl chloride.

In the case where the waste water to be clarified contains a large amount, for example, 10,000 ppm or more, of finely divided oily materials and/or a large amount of sludge (solid materials), a gravity separating device for gravitationally separating the oily materials and solid materials from the waste water may be located between the waste water supply source and a furthermost upstream fibrous stratum. The gravity separating device is provided with a plurality of plates arranged so as to form zigzag paths of the waste water or so as to prevent the waste water from flowing in a straight path. While flowing through the paths, particles of the finely divided oily materials are allowed to be coarsened whereby the coarsened particles in turn are allowed to float up into a space formed above the upper level of the waste water in the device. Also, while the waste water flows through the paths, the finely divided solid materials (sludge) are allowed to be deposited onto the bottom of the device. The oily materials thus separated can be discharged through an outlet located on the top portion of the device, and the solid materials separated above can be discharged through another outlet disposed at the bottom of the device. The gravity separating device also may be located between the fibrous strata, depending on the feature of the waste water to be clarified.

The apparatus of the accompanying drawing, has two fibrous strata. However, the apparatus usable for the method of present invention can include three or more fibrous strata.

In order to effect the method of the present invention, the waste water is forwarded through the clarifying apparatus as shown by an arrow line A. More particularly, the waste water containing the finely divided oily materials and solid materials is introduced into the strainer 6 of the first outer column 1 from a supply source (not shown) of the waste water through the supply pipe 4. Portions of the solid materials having a relatively large size, that is, sludge, were filtered by the strainer 6 and discharged through the pipe 8 and valve 7 to the outside of the apparatus. The waste water thus filtered is introduced into the lower space 12 in the first outer column 1 and passes upwardly through the first fibrous stratum 30. While passing through the stratum 30, the particles of the finely divided oily materials are allowed to coarsen, that is, to become greater in size, by incorporating said oily materials together, and to catch the finely divided solid materials into the coarsened particles thereof. After passing through the first fibrous stratum 30, the waste water flows upward along the inside space 13 of the first inner column 9 and the upper space 11 of the first outer column 1. While flowing, the coarsened particles of the oily materials containing the finely divided solid materials are allowed to float up and form a separate layer 32 of the oily materials and the solid materials on the upper surface of the waste water in the upper space 11 of the first outer column 1. The oily materials and solid materials are discharged from the separate layer 32 through the pipe 16 and the valve 15 to the outside of the apparatus.

The remaining waste water in the upper space 11 of the first outer column 1 is introduced into the lower space 22 in the second outer column 2 through the annular space 14 in the first outer column 1 and through the connecting pipe 3. The waste water passes upward through the second fibrous stratum 31 in the second inner column 17. During this passage, the particles of the oily materials are incorporated together and form particles oily materials of a large size than those before incorporation, thereby said oily particles are able to collect therein finely divided solid materials. After passing through the second stratum 32, the waste water flows upward through the inside space 23 in the second inner column 17 and through the upper space 21 in the second outer column 2 so as to allow the larger size oily material particles to float up and form a separate layer 33 of the oily materials and solid materials on the upper surface of the remaining waste water. The waste water which has become free from the oily materials and solid materials is discharged through the annular space 24 in the second outer column 2 and through the delivery pipe 5 to the outside of the apparatus.

In the method of the present invention, the speed of flow of the waste water through the fibrous strata may be adjusted depending on the pressure drop, the desired clarifying effect, the contents of the oily materials and of the solid materials, and the features of the strata. Generally, it is preferable that the waste water flows through each fibrous stratum at a speed of 3 cm/sec or lower, more preferably, 1.5 to 0.1 cm/sec.

In the apparatus of the accompanying drawing, the fibrous strata are located so that the waste water flows upward through each fibrous strata. However, the fibrous strata may be arranged so that the waste water can flow downward or horizontally through the strata. Otherwise, the fibrous strata may be arranged so that the waste water is fed into the center portion of each stratum and, then, flows toward the peripheral portion thereof or the waste water is fed to the peripheral portion of each stratum and then, flows toward the center portion thereof. In any arrangement of the fibrous strata, it is necessary that the outlet face of each stratum opens to a space through which the coarsened particles of the oily materials can float upward and form a separate layer of the oily materials on the upper surface of the waste water in the space. Further, the fibrous strata should be arranged so that the coarsened particles of the oily materials in the waste water passed through a fibrous stratum cannot flow into another fibrous stratum located downstream the preceding stratum.

According to the method of the present invention, it becomes possible to completely eliminate the finely divided oily materials together with the finely divided solid materials which were difficult to eliminate by using the conventional methods. Also, it is possible to make the apparatus for clarifying the waste water smaller and more compact than those of the conventional methods. Further, the method of the present invention can be easily operated at a relatively low cost.

The following specific examples will serve to more fully explain the practice of the present invention. However, it should be understood that these are only examples and should not limit the present invention in any way.

EXAMPLE 1 AND COMPARISON EXAMPLES 1 TO 4

In Example 1, the following procedures were carried out.

A. Preparation of hydrophilic acrylic polymer fibers

Acrylic copolymer fibers were produced from a copolymer of 93% by weight of acrylonitrile and 7% by weight of vinyl acetate by wet spinning a solution of the copolymer and cutting the spun filaments to form staple fibers of 9.6 cm long.

The acrylic copolymer fibers were immersed into an aqueous solution of 20 g/l of hydroxylamine sulfate and 40 g/l of disodium hydrogenphosphate . 12 hydrate in a liquor ratio by weight of the fibers to the aqueous solution of 1:15, at a temperature of 100° C, for 90 minutes, to form intermolecular linkages in the copolymer. The acrylic copolymer fibers intermolecularly linked above were washed with water, dried and, thereafter, immersed into an aqueous solution of 40 g/l of sodium hydroxide, at ambient temperature, for 24 hours, to hydrolyse the above intermolecularly linked acrylic copolymer. The resultant hydrophilic acrylic copolymer fibers each had a denier of 54 and a degree of swelling in water of 30.6% at a temperature of 20° C. The acrylic copolymer fibers prepared above are referred to as "acrylic copolymer fibers A" hereinafter.

The same procedures as mentioned above were repeated to produce another hydrophilic acrylic copolymer fibers having a denier of 3.8 and a degree of swelling in water of 37.6%. The acrylic copolymer fibers thus prepared are referred to as "acrylic copolymer fibers B" hereinafter.

B. Clarifying apparatus

A clarifying apparatus of the type indicated in the accompanying drawing was employed. The apparatus was provided with a strainer 6 composed of two 40 mesh metal nets which were superimposed on each other, and connected to a supply source tank (not shown in the drawing) containing the waste water to be clarified through a centrifugal pump (not shown) of 3600 rpm rotation.

C. Preparation of hydrophilic fiber mass strata

A hydrophilic fibrous mass for forming the first stratum 30 in the drawing, was prepared from 924 g of the acrylic copolymer fibers A. The mass was placed in the first inner metal column 9 having an inside cross-sectional area of 154 cm² and a length of 35 cm and compressed to form a stratum having a thickness of 20 cm and a density of 0.30 g/cm³. In the first stratum 30 thus formed, the gaps between the fibers were about 70 microns on the average.

Separately, another fibrous mass was prepared from 400 g of the acrylic copolymer fibers B. The fibrous mass was placed in the second inner column 17 having an inside cross-sectional area of 154 cm² and a length of 30 cm and compressed to form the second fibrous stratum 31. The fibrous stratum 31 thus formed had a thickness of 10 cm and a density of 0.26 g/cm³. In this stratum, the gaps between the fibers were about 22 microns on the average.

D. Clarifying operation

In order to prepare an experimental waste water, well water containing 150 ppm of non-volatile materials (including solid materials) was mixed with heavy oil B. The waste water contained 10,000 ppm of the heavy oil.

The waste water was introduced into the above-mentioned clarifying apparatus by means of the centrifugal pump while finely dividing and suspending the heavy oil and the solid material in the waste water. The waste water successively passed through the first and second fibrous strata 30 and 31 at a velocity of 0.5 cm/second.

E. Determination of clarifying effect

In the clarifying operation, after the waste water in an amount of 36 m³ per m² of the inside cross-sectional area of each inner column was clarified, a sample of the clarified water was collected. The same collecting operation of the clarified water as mentioned above was carried out again after the waste water in an amount of 3,000 m³ per m² of the inside cross-sectional area of each inner column was clarified.

The samples were subjected to determination of content of the oily materials in the clarified water. The oily material was extracted with tetrachloromethane, and the amount of the extracted oily material was determined in accordance with an infrared absorption spectrum method of JISK0102, using a quartz cell having an inside thickness of 100 mm.

After the waste water was clarified in the amounts of 36 and 3,000 m³ per m² of the inside cross-sectional area of the inner column, the pressure drop between the pressure of the waste water at the upper face of the second stratum and that at the lower face of the first stratum was measured. The results are indicated in Table 2.

In Comparison Example 1, the same procedures as in Example 1 were repeated with the exception that the second inner column contained no fibrous stratum whereas the first inner column contained the same fibrous stratus as in Example 1 consisting of the acrylic copolymer fibers A.

In Comparison Example 2, the same procedures were repeated with the exception that the first stratum in the first inner column was formed from the acrylic copolymer fiber B and the second inner column contained no fibrous stratum. The stratum of the acrylic copolymer fiber B had a thickness of 10 cm, a density of 0.26 g/cm³ and gaps between the fibers of about 22 microns on the average.

In Comparison Example 3, procedures identical to those in Example 1 were carried out, except that the second fibrous stratum was also formed from the acrylic copolymer fibers A. The second fibrous stratum had a thickness of 20 cm, a density of 0.30 g/cm³ and a gap, on the average, between the fibers of 70 microns.

In Comparison Example 4, the same procedures as in Example 1 were effected, except that the first fibrous stratum was formed by the acrylic copolymer fibers B. The first fibrous stratum had a thickness of 10 cm, a density of 0.26 g/cm³ and a gap, on the average, between the fibers of 22 microns.

The results of Comparison Examples 1 to 4 are indicated in Tables 1 and 2.

Table 1

Content in ppm of Oily Materials in Clarified Water

| | | Type of Fiber | | Amount of waste water Clarified (m³/m²) | |
|---|---|---|---|---|---|
| Example | | First stratum | Second stratum | 36 | 3,000 |
| Example | 1 | A | B | 1.9 | 2.3 |
| Comparison Example | 1 | A | none | 2.5 | 27.8 |
| | 2 | B | none | 2.1 | - *1 |
| | 3 | A | A | 2.3 | 24.7 |
| | 4 | B | B | 1.6 | - *2 |

Table 2

Pressure drop in kg/cm² of Waste Water between Upper Face of Second Stratum and Lower Face of First Stratum

| | | Type of fiber | | Amount of waste water clarified (m³/m²) | |
|---|---|---|---|---|---|
| Example | | First stratum | Second stratum | 36 | 3,000 |
| Example | 1 | A | B | 0.10 | 0.39 |
| Comparison Example | 1 | A | none | 0.08 | 0.35 |
| | 2 | B | none | 0.75 | - *1 |

Table 2-continued

| | Pressure drop in kg/cm² of Waste Water between Upper Face of Second Stratum and Lower Face of First Stratum | | | |
|---|---|---|---|---|
| | | | Item | |
| | Type of fiber | | Amount of waste water clarified (m³/m²) | |
| Example | First stratum | Second stratum | 36 | 3,000 |
| 3 | A | A | 0.08 | 0.38 |
| 4 | B | B | 0.80 | - *2 |

(Note):
*1 - After 72 m³/m² of the waste water was clarified, the pressure drop increased to 2 kg/cm². Accordingly, it was impossible to continue the treatment of the waste water.
*2 - Since after 68 m³/m² of the waste water was clarified, the pressure drop increased to 2 kg/cm², the clarification of the waste water was stopped.

From Tables 1 and 2, it is evident that the clarifying operations in Comparison Examples 1 and 3 were poor in clarifying effect, and the clarifying operations in Comparison Examples 2 and 4 were impossible to be continued over a long period of time due to the increase of pressure drop. Compared with these, the clarifying operation of Example 1 had a high clarifying effect and could be continued over a long period of time with very slight increase of the pressure drop.

For the purpose of comparison, the same clarifying operations as in Example 1 were repeated using non-modified acrylic polymer fibers having a denier of 30.

For the purpose of another comparison, the same clarifying opeations as in Example 1 were carried out using polypropylene fibers of 15 denier. In each of these comparative clarifying opeations, it was observed that the clarifying effect was very poor and the pressure drop rapidly increased to such an extent that the clarifying operation could not be continued.

EXAMPLES 2 AND 3 AND COMPARISON EXAMPLES 5 AND 6

In Example 2, the following procedures were carried out.

A. Preparation of hydrophilic fibers

In accordance with the method of Example 1, acrylic copolymer fibers having a denier of 37 and a degree of swelling in water of 33.8% were produced. This type of acrylic copolymer fibers are referred to as "acrylic copolymer fibers C" hereinafter. The acrylic copolymer fibers B were produced again.

B. Clarifying apparatus

The same apparatus as in Example 1 was employed with the exceptions that the centrifugal pump was of 1,800 rpm, that the strainer composed of two superimposed 40 mesh metal nets was located outside the first outer column, and that a gravity separation device for gravitationally separating the oily materials from the waste water was located between the first outer column and the strainer. The gravity separating device was provided with a plurality of corrugated plate interceptors arranged in parallel at interval of 1.5 cm. The paths of the waste water to be clarified formed between the corrugated plates had a length of 25 cm and the sum of the cross-sectional areas of the paths was 400 cm².

C. Preparation of hydrophilic fiber mass strata

A hydrophilic fiber mass for forming the first stratum was prepared from 485 g of the acrylic copolymer fibers C. The mass was placed in the first inner column having an inside cross-sectional area of 154 cm² and a length of 35 cm, and compressed to form the first stratum having a thickness of 15 cm, a density of 0.21 g/cm³ and a gap, on the average, between the fibers of about 82 microns.

Separately, another hydrophilic fiber mass was prepared from 280 g of the acrylic copolymer fibers B. The mass was placed in the second inner column having an inside cross-sectional area of 154 cm² and a length of 30 cm, and compressed to form the second stratum having a thickness of 7 cm, a density of 0.26 g/cm² and a gap, on the average, between the fibers of about 22 microns.

D. Clarifying operation

In order to prepare waste to be clarified, well water containing 150 ppm of non-volatile materials (including solid materials) was mixed with B heavy oil so that the content of the oily materials in the waste water became 300,000 ppm.

The waste water was fed into the clarifying apparatus by working the centrifugal pump at 1,800 rpm while finely dividing and suspending the oily materials in the waste water.

The waste water passed successively through the first and second strata at a velocity of 0.5 cm/minute.

E. Determination of clarifying effect

The content of the oily materials in the clarified water was determined in accordance with the method mentioned in Example 1 after the waste water was clarified in amounts of 18 m³ and 900 m³ per m² of the inside cross-sectional area of the stratum. The pressures drop of the waste water were measured at the same stages as mentioned above by the same method as in Example 1.

In Example 3, procedures identical to those in Example 2 were carried out without using the gravity separating device for the oily materials.

The results of Examples 2 and 3 are indicated in Table 3.

In Comparison Example 5, the same procedures as in Example 3 were effected with the exception that no fibrous stratum was formed in the second inner column.

In Comparison Example 6, the same procedures as in Example 3 were repeated, except that the first stratum was prepared from 280 g of the acrylic copolymer fibers B, and had a thickness of 7 cm, a density of 0.26 g/cm and a gap, on the average, between the fibers of about 22 microns, and no stratum was placed in the second inner column.

The results of Comparison Examples 5 and 6 are also indicated in Table 3.

Table 3

| | | | | | Item | | | |
|---|---|---|---|---|---|---|---|---|
| | | | | | Content of oily materials | | pressure drop (kg/cm²) | |
| | | Gravity separating | Type of fiber | | Amount of waste water clarified (m³/m²) | | Amount of waste water clarified (m³/m²) | |
| Example | | device | First stratum | Second stratum | 18 | 900 | 18 | 900 |
| Example | 2 | used | C | B | 1.8 | 2.0 | 0.05 | 0.16 |
| | 3 | not used | C | B | 2.4 | 3.8 | 0.90 | 1.02 |
| Comparative Example | 5 | used | C | none | 5.8 | 28.5 | 0.04 | 0.14 |

Table 3-continued

| | | | | Item | | | |
|---|---|---|---|---|---|---|---|
| | | | | Content of oily materials | | pressure drop (kg/cm²) | |
| | Gravity | Type of fiber | | Amount of waste water clarified (m³/m²) | | Amount of waste water clarified (m³/m²) | |
| Example | separating device | First stratum | Second stratum | 18 | 900 | 18 | 900 |
| 6 | used | B | none | 1.9 | - *3 | 0.65 | - *3 |

(Note):
*3 - When the waste water was clarified in an amount of 108 m³ per m² of the cross-sectional area of the stratum, the pressure drop increased to 2 kg/cm². Accordingly, the clarifying operation was stopped at this stage.

Table 3 shows that the clarifying effect of Comparison Example 5 was poor and the clarifying operation in Comparison Example 6 could not be continued for a long period of time due to the rapid increase of the pressure drop.

The clarifying operation in Example 2 had an excellent clarifying effect and a very small increase in the pressure drop.

In Example 3, the clarifying effect was sufficiently high. However, in Example 3, the clarifying effect is lower and the increase of the pressure drop is greater than those in Example 2 due to lack of the gravity separating device. This is due to the fact that by passing the waste water through the gravity separating device, the content of the oily materials decreased from 300,000 ppm to 2,000 to 4,000 ppm. That is, it was observed that the gravity separating device was remarkably effective in reducing the load to be applied to the first stratum.

EXAMPLES 4, 5 AND 6

The same procedures as in Example 1 were repeated using viscose rayon staple fibers having a denier of 15 in Example 4 and cotton gauze in Example 5 and cotton yarns of a metric yarn number count of 5 in Example 6, in place of the acrylic copolymer fibers. In each of the examples, the waste water was satisfactorily clarified with a small increase of the pressure drop.

REFERENCE EXAMPLE

Hydrophilic acrylic copolymer fibers of 21, 37 and 54 deniers, and 9.6 cm long, were prepared in accordance with the method mentioned in Example 1. Separately, viscose rayon staple fibers of 3, 7 and 15 deniers, and 8.9 cm long, were prepared.

Each type of the fiber was stuffed into an iron pipe having an inside diameter of 2.1 cm and a length of 50 cm, so as to form a fibrous stratum having the features shown in Table 4.

Waste water containing 10,000 ppm of heavy oil B was supplied into the pipe by means of a centrifugal pump at 1,800 rpm, so as to flow the waste water through the fibrous stratum at a velocity of 1 cm/sec. The appearance of each clarified water, that is, the clarifying effect, was observed and water permeability of each fibrous stratum was determined at a pressure of 40 cm aqua. The results are shown in Table 4.

Table 4

| | Fibrous stratum | | | | | |
|---|---|---|---|---|---|---|
| Fiber | Denier of fiber | Density (g/cm³) | Thickness (cm) | Gap on the average between fibers (micron) | Water permeability (cm/sec) | Appearance of clarified water (clarifying effect) |
| Hydrophilic acrylic copolymer fiber | 21 | 0.10 | 20 | 114 | 3.90 | clear |
| | 21 | 0.20 | 20 | 65 | 0.20 | " |
| | 21 | 0.30 | 10 | 44 | 0.25 | " |
| | 21 | 0.30 | 20 | 44 | 0.05 | " |
| | 37 | 0.10 | 30 | 149 | 2.83 | " |
| | 37 | 0.20 | 10 | 85 | 2.00 | " |
| | 37 | 0.20 | 20 | 85 | 1.68 | " |
| | 37 | 0.30 | 20 | 58 | 0.35 | " |
| | 54 | 0.20 | 20 | 104 | 3.90 | " |
| | 54 | 0.30 | 10 | 70 | 1.20 | " |
| | 54 | 0.30 | 20 | 70 | 0.39 | " |
| Viscose rayon fiber | 15 | 0.20 | 4 | 41.5 | 1.96 | " |
| | 15 | 0.20 | 10 | 41.5 | 0.69 | " |
| | 15 | 0.20 | 20 | 41.5 | 0.20 | " |
| | 15 | 0.20 | 30 | 41.5 | 0.11 | " |

Table 4 shows that, the waste water can be clarified with the hydrophilic fiber stratum by suitably adjusting the denier of the fibers, the thickness and density of the stratum and gap, on the average, between the fibers in the stratum.

What we claim is:

1. A method for clarifying waste water containing finely divided oil materials together with finely divided sludge, which comprises:
    a. passing said waste water through an upstream fibrous strata of hydrophilic organic polymer fibers and coarsening said finely divided oil materials to catch and collect the finely divided sludge;
    b. passing said waste water into a space where said coarsened particles are allowed to form a separate layer on the upper surface of said waste water in said space and are removed from said waste water;
    c. passing said waste water in said space through a downstream fibrous strata composed of hydrophilic organic polymer fibers, and coarsening the finely divided oily materials in said waste water to catch and collect the finely divided solid materials;
    d. introducing said waste water into a space in which said coarsened articles are allowed to float and form a separate layer on the surface of said waste water in said space and are removed from said waste water; and e. recovering clarified waste water, wherein said upstream, fibrous strata is composed of hydrophilic fibers having a denier of 10–300 and is distributed to form gaps of 40 to 180 microns between said fibers, said stratum having a density of from 0.1 to 0.45 g/cm$^2$, a thickness of 3 to 100 cm, and a water permeability of 5 cm/sec or less under a pressure of 40 cm of water, and wherein said downstream fibrous strata has gaps of 15 to 100 microns, on the average, formed between the fibers and wherein said gaps are smaller, on the average than those in said upstream strata.

2. A method as claimed in claim 1, wherein said hydrophilic organic polymer fiber is a hot water-soluble polyvinyl alcohol fiber which has been converted from a cold water-soluble polyvinyl alcohol fiber by way of heat treatment at a temperature of 190° to 240° C.

3. The method of claim 1, wherein said hydrophilic organic polymer fiber is produced from acrylonitrile polymer or a copolymer of at least 85% by weight of acrylonitrile and of a balance of at least one monomer which is capable of copolymerizing with acrylonitrile, by fiber-forming said polymer or copolymer, treating said fibers with hydroxylamine to molecularly link the polymer or copolymer and, then hydrolyzing a portion of nitrile radicals in the polymer or copolymer with an alkali to convert the nitrile radical to carboxylic acid radical or its alkali salt radical.

4. The method of claim 3, wherein said hydrophilic acrylonitrile polymer or copolymer fiber has a degree of swelling in water of 15 to 70%.

5. The method of claim 1, wherein said hydrophilic polymer fiber is selected from hydrophilic synthetic fibers having 0.2 meq/g or more of a free acid radical.

* * * * *